(12) United States Patent
Du et al.

(10) Patent No.: US 11,941,865 B2
(45) Date of Patent: Mar. 26, 2024

(54) HYPERSPECTRAL IMAGE CLASSIFICATION METHOD BASED ON CONTEXT-RICH NETWORKS

(71) Applicant: WUHAN UNIVERSITY, Hubei (CN)

(72) Inventors: Bo Du, Hubei (CN); Di Wang, Hubei (CN); Liangpei Zhang, Hubei (CN)

(73) Assignee: WUHAN UNIVERSITY, Hubei (CN)

( * ) Notice: Subject to any disclaimer, the term of this patent is extended or adjusted under 35 U.S.C. 154(b) by 0 days.

(21) Appl. No.: 18/337,444

(22) Filed: Jun. 20, 2023

(65) Prior Publication Data

US 2023/0334829 A1    Oct. 19, 2023

Related U.S. Application Data

(63) Continuation of application No. PCT/CN2021/122346, filed on Sep. 30, 2021.

(30) Foreign Application Priority Data

Aug. 16, 2021    (CN) .......................... 202110935090.3

(51) Int. Cl.
  *G06V 10/764*   (2022.01)
  *G06V 10/32*   (2022.01)
  (Continued)

(52) U.S. Cl.
  CPC ............ *G06V 10/764* (2022.01); *G06V 10/32* (2022.01); *G06V 10/7715* (2022.01);
  (Continued)

(58) Field of Classification Search
  CPC .......... G06N 3/045; G06N 3/08; G06N 3/084; G06F 18/214; G06V 10/82; G06T 2207/20081; G06T 2207/20084
  See application file for complete search history.

(56) References Cited

U.S. PATENT DOCUMENTS

2020/0160533 A1    5/2020  Du et al.

FOREIGN PATENT DOCUMENTS

CN        111126256        5/2020
CN        111563508        8/2020
(Continued)

OTHER PUBLICATIONS

Peng et al., "Densely Based Multi-Scale and Multi-Modal Fully Convolutional Networks for High-Resolution Remote-Sensing Image Semantic Segmentation," in IEEE Journal of Selected Topics in Applied Earth Observations and Remote Sensing, vol. 12, No. 8, pp. 2612-2626, Aug. 2019. (Year: 2019).*

(Continued)

*Primary Examiner* — Ross Varndell
(74) *Attorney, Agent, or Firm* — JCIP GLOBAL INC.

(57) ABSTRACT

Disclosed in the present invention is hyperspectral image classification method based on context-rich networks. The method comprises a training stage and a prediction stage, wherein the training stage comprises image pre-processing, sample selection and network training. Firstly, performing normalization on a hyperspectral image, and then randomly selecting an appropriate proportion of marked samples from each category to generate a label map, and performing training by using the designed network; in the prediction stage, directly inputting the whole image into the trained network and obtaining a final classification result. By means of the present invention, data pre-processing, feature extraction, the process of context-rich information capturing, and classification are taken into comprehensive consideration in the whole flow; and the classification of a hyperspectral image is realized by means of constructing an end-to-end network.

7 Claims, 5 Drawing Sheets

(51) Int. Cl.
  *G06V 10/77* (2022.01)
  *G06V 10/774* (2022.01)
  *G06V 10/776* (2022.01)
  *G06V 20/10* (2022.01)

(52) U.S. Cl.
  CPC .......... *G06V 10/774* (2022.01); *G06V 10/776* (2022.01); *G06V 20/194* (2022.01)

(56) References Cited

FOREIGN PATENT DOCUMENTS

CN 111914907 11/2020
CN 112287978 1/2021

OTHER PUBLICATIONS

Tao et al., "Unsupervised-Restricted Deconvolutional Neural Network for Very High Resolution Remote-Sensing Image Classification," in IEEE Transactions on Geoscience and Remote Sensing, vol. 55, No. 12, pp. 6805-6823, Dec. 2017, doi: 10.1109/TGRS.2017.2734697. (Year: 2017).*

S. Ghaderizadeh, D. Abbasi-Moghadam, A. Sharifi, N. Zhao and A. Tariq, "Hyperspectral Image Classification Using a Hybrid 3D-2D Convolutional Neural Networks," in IEEE Journal of Selected Topics in Applied Earth Observations and Remote Sensing, vol. 14, pp. 7570-7588, 2021. (Year: 2021).*

M. Zhang, W. Li and Q. Du, "Diverse Region-Based CNN for Hyperspectral Image Classification," in IEEE Transactions on Image Processing, vol. 27, No. 6, pp. 2623-2634, Jun. 2018, doi: 10.1109/TIP.2018.2809606. (Year: 2018).*

J. Fu, J. Liu, J. Jiang, Y. Li, Y. Bao and H. Lu, "Scene Segmentation With Dual Relation-Aware Attention Network," in IEEE Transactions on Neural Networks and Learning Systems, vol. 32, No. 6, pp. 2547-2560, Jun. 2021, doi: 10.1109/TNNLS.2020.3006524. (Year: 2021).*

Hao Chen et al., "A Spatial-Temporal Attention-Based Method and a New Dataset for Remote Sensing Image Change Detection", remote sensing, vol. 12, Issue 1662, May 2020, pp. 1-23.

Di Wang et al., "Adaptive Spectral-Spatial Multiscale Contextual Feature Extraction for Hyperspectral Image Classification", IEEE Transactions on Geoscience and Remote Sensing, vol. 59, Issue 3, Mar. 2021, pp. 2461-2477.

"International Search Report (Form PCT/ISA/210) of PCT/CN2021/122346", dated May 17, 2022, with English translation thereof, pp. 1-6.

* cited by examiner

HYPERSPECTRAL IMAGE CLASSIFICATION METHOD BASED ON CONTEXT-RICH NETWORKS

CROSS-REFERENCE TO RELATED APPLICATION

This is a continuation-in-part application of International Application No. PCT/CN2021/122346, filed on Sep. 30, 2021, which claims the priority benefits of China Application No. 202110935090.3, filed on Aug. 16, 2021. The entirety of each of the above-mentioned patent applications is hereby incorporated by reference herein and made a part of this specification.

BACKGROUND

Technical Field

The invention belongs to the technical field of remote sensing image processing, in particular to a hyperspectral image classification method based on context-rich networks.

Description of Related Art

With the development of earth observation technology, hyperspectral images with hundreds of continuous narrow bands and abundant spatial-spectral information can be obtained. The goal of hyperspectral image classification is to assign a unique category label to each pixel in the image and then generate an accurate classification map. This classification map plays an important role in agriculture, environmental management, anomaly detection, and other industries. However, this task is still challenging, because the complexities of the scale, shape, and location of different ground objects in hyperspectral images will affect the judgment of ground object categories.

Traditional classification methods directly input the original spectral vector into the classifier, which means the lack of surrounding environment information, so the accuracies of these methods usually are limited. Later, there are many methods to extract spatial and spectral features simultaneously through feature engineering. However, the features extracted by these methods are shallow features, which are not stable under complex conditions, and cannot depict the essential attributes of objects. In addition, these feature engineering methods are often limited by the experiences of designers and are not flexible enough.

In order to obtain more essential features, data-driven deep learning technology is widely used in hyperspectral image classification. The fully connected network is the earliest deep model. However, this network limits the size of the input data because all multidimensional data must be flattened, which undoubtedly loses the spatial structure. Then, many methods emerged to solve this problem by virtue of the distinguished characteristics of local perception and weight sharing in convolutional neural networks. They basically adopt a process of generating a series of spatial patches centered on the pixels to be classified and inputting these patches into the network to obtain the central pixel category. However, this means that the patches of adjacent pixels have overlapping areas, bringing unnecessary and redundant calculations. In addition, the limited size of these patches not only limits the receptive field of the network but also hinders the modeling of long-range dependencies. In fact, in addition to a large number of bands, the input and output of hyperspectral image classification are very similar to the semantic segmentation task of natural images, which shows that hyperspectral image classification can adopt similar methods as natural image segmentation. So far, some segmentation networks based on full convolution have been applied to hyperspectral image classification, but these networks still cannot fully extract information, because they only increase the receptive field by stacking convolutional layers. These networks also cannot capture non-local context information, because the adopted dilated convolutions or ordinary convolutions are local operators. Later, some work used the spatial non-local self-attention module to extract a wide range of context information. However, these modules can only capture the context information between different pixels within a specific feature, while the relationships between features, especially the relationships between multi-scale features that are crucial for hyperspectral image classification, and the more effective context-rich information that can simultaneously across different scales and spatial locations, have not been obtained, which limits the further improvement of classification accuracy.

SUMMARY

In view of the shortcomings of existing technologies, this invention provides a hyperspectral image classification method based on context-rich networks.

The invention provides a hyperspectral image classification method based on rich context-rich networks, including two stages: training and prediction. The training stage includes image pre-processing, sample selection, and network training. It is characterized by: more abundant context information is extracted from the multiple features generated by the existing multi-scale feature extraction module through two parts including intra-feature relationship capturing and inter-feature relationship capturing for hyperspectral image classification. First of all, the context relationships existing in each feature are captured, where the existing non-local self-attention mechanism is used to realize the adaptive aggregation of spatial information by calculating the similarities between pixel representations, so as to obtain more effective spatial context features. Then, a scale context-aware module is added to capture the inter-features scale relationship using the self-attention algorithm. Finally, context-rich features that can simultaneously perceive the relationships of positions across spatial and different scales are obtained for hyperspectral image classification. This method includes the following steps:

Step 1, Pre-processing the hyperspectral image;

Step 2, Selecting the training set, and generating a ground truth label map with the same width and height as the image in step 1, with the value of the category ID, and setting the pixels that are not position selected in the label map as the background value to be ignored in the subsequent calculation of the loss function;

Step 3, Constructing the context-rich network, the overall structure of the network is divided into three parts: feature extraction module, context-rich information capturing module, and classification module;

wherein the feature extraction module is used to process the inputted pre-processed hyperspectral image to obtain feature X;

The specific process of the context-rich information capturing module is: the feature X obtained by the feature extraction module is meshed into grids of different sizes in different paths parallelly. In each path, intra-feature relationship extraction is performed within each grid in the grids, respectively, to complete the spatial context information aggregation, the PAM module (parallel attention module) is used to realize a spatial context information extraction process in the grids; A feature set is obtained after completing the spatial context information extraction process in each path. Then, the scale context-aware module is used to extract the contextual relationship between features, obtaining the features that have both spatial and scale contexts. Finally, inputting this feature into the classification module;

The classification module is used to predict the classification map;

Step 4, Training the context-rich network with the training set to achieve convergence of the loss function;

Step 5, The hyperspectral image classification is completed by inputting the image pre-processed and to be classified in step 1 to the trained network.

Further, the pre-processing is Z-score standardization or normalization process on the hyperspectral image, as the following implementations:

performing the normalization process on the hyperspectral data $X_0$ through the formula $$x'_{ijc} = \frac{2(x_{ijc} - x_{cmin})}{x_{cmax} - x_{cmin}} - 1 \text{ or } x'_{ijc} = \frac{x_{ijc} - \mu_c}{\sigma_c},$$

wherein $x_{ijc}$ denotes the value of pixel $x_{ij}$ at band c in row i and column j of $X_0$, $x_{cmin}$, $x_{cmax}$ are the minimum value and the maximum value of band c in $X_0$, $\mu_c$, $\sigma_c$ are mean and standard deviation of band c. The generated data is represented by $X'_0$.

Further, the basic feature extraction is directly passing the inputted pre-processed hyperspectral image through five convolutional layers, these convolutional layers all contain three operations including convolution, group normalization, and nonlinear mapping. The numbers of convolution kernels of these five convolutional layers are 64, 112, 160, 208 and 256, respectively, wherein the first convolutional layer is followed by an average pooling layer.

Further, the classification module includes five operations: the first convolution, a group normalization, a nonlinear mapping, the second convolution, and a softmax function, wherein the first convolution operation contains 128 convolution kernels, and the number of convolution kernels in the second convolution is the same as the number of categories.

Further, during the training process, the network parameters adopt Xavier initialization, and when optimizing the parameters, a stochastic gradient descent algorithm with momentum is used to minimize the loss function of the network. The trained network can effectively classify the context-rich features of hyperspectral images.

Further, in the context-rich information capturing module, before performing intra-feature context information extraction, the dimension of the feature $X=\{X_i \in \mathbb{R}^{C_0 \times H \times W}\}_{i=1}^{N_s}$ obtained by the feature extraction module is reduced with a 1×1 convolution, wherein $C_0$, H and W are separately the channel number, width and height of X, respectively, and $N_s$ is the number of paths. In each path, intra-feature relationship extraction is respectively performed in each grid to complete the spatial context information aggregation; For the path i that has n×n grids, that is, (a feature is) divided into n parts in the width direction and the height direction, respectively, wherein the size of each grid is $$\left\lfloor \frac{H}{n} \right\rfloor \times \left\lfloor \frac{W}{n} \right\rfloor.$$

First, three 1×1 convolutions are respectively used to map the dimension-reduced X to three features: $Q_i$, $K_i$, $V_i$. For a grid g, the features within the coverage of this grid are taken respectively from features $Q_i$, $K_i$, $V_i$ and perform matrix shapes transformation, wherein both the channels number of $Q_i$, $K_i$ are c1, and the channel number of $V_i$ is c2, obtaining $q_g \in \mathbb{R}^{c1 \times hw}, k_g \in \mathbb{R}^{c1 \times hw}, v_g \in \mathbb{R}^{c2 \times hw}$. Using the $q_g$, $k_g$, $v_g$ respectively as the query feature, key feature and value feature for realizing the spatial context information extraction process in the grid, and generating a new feature $p_g \in \mathbb{R}^{c2 \times h \times w}$ through the matrix shape transformation, wherein $$h = \left\lfloor \frac{H}{n} \right\rfloor, w = \left\lfloor \frac{W}{n} \right\rfloor.$$

This process can be formulated as $$p_g = \text{softmax}(q_g^T k_g) v_g^t$$

Then, $p_g$ is filled to the position covered by grid g in the dimension-reduced feature $X_i$, while all the other grids are processed in the same way, thus obtaining a new feature $P_i$ that completes spatial contexts in that path (that is, completes spatial context capturing in that path). And each path will generate a new feature, denoted as a feature set=$\{P_i \in \mathbb{R}^{C_1 \times H \times W}\}_{i=1}^{N_s}$, wherein $C_1$ is the number of channels, $C_1 = c2 = 4c1$.

Further, the specific implementation process of extracting the inter-feature relationship using the scale context-aware module is as follows;

Firstly, three groups of 1×1 convolution are utilized to respectively map feature P and concatenate the results in the scale dimension, obtaining the query feature $Q \in \mathbb{R}^{N_s \times C_2 \times H \times W}$, the key feature $K \in \mathbb{R}^{N_s \times C_2 \times H \times W}$ and the value feature $V \in \mathbb{R}^{N_s \times C_1 \times H \times W}$, wherein $$C_2 = \frac{C_1}{4}.$$

Then, performing the matrix shapes transformation on Q, K, V to obtain $Q' \in \mathbb{R}^{N_s \times C_2 HW}$, $K' \in \mathbb{R}^{N_2 \times C_2 HW}$ and $V' \in \mathbb{R}^{N_s \times C_1 HW}$, and the scale attention map $M \in \mathbb{R}^{N_s \times N_s}$ is obtained through the below formula:

$$M_{ij} = \frac{Q'_i K'_j}{\sum_{j=1}^{N_s} Q'_i K'_j}$$

Wherein i and j represent two different scales respectively, that is, the indexes of two paths, and also the row and column positions of a corresponding attention value in the scale attention map. Multiplying the scale attention map M with the value feature V' to obtain a new feature S that simultaneously perceive intra-feature and inter-feature context dependencies:

$$S = MV'$$

Finally, after concatenating S and X in a channel dimension, inputting it into the classification module.

Compared with existing techniques, the advantages and beneficial effects of this invention are:

(1) This invention proposes a scale context-aware module that can effectively capture the context dependencies lying in multiple features (also referred as inter-feature context dependencies).

(2) This invention proposes a context-rich information capturing module, which can extract the relationships between any locations across features.

(3) This invention develops a context-rich classification network based on the above modules, achieving the hyperspectral image classification in an end-to-end manner.

DESCRIPTION OF THE EMBODIMENTS

In order to facilitate the understanding and implementation of the technical solution of the invention by general technical personnel in the art. This invention is further detailedly described below by combining in combination with the drawings and embodiment. It should be understood that the embodiment described here is only for the purpose of illustrating and explaining this invention, and not to limit the invention.

This invention discloses a hyperspectral image classification method based on context-rich networks (also denoted as an end-to-end hyperspectral image classification method based on context-rich networks). The method contains two stages: training and prediction. The training stage includes image pre-processing, sample selection, and network training. Firstly, the hyperspectral images are globally normalized, and then a suitable proportion of samples with labels are randomly selected for each category to generate the labeled map and trained using the designed network. In the prediction phase, the whole image is directly input into the trained network and the final classification results are obtained. It contains the following steps:

Step 1: Pre-processing the hyperspectral image. In detail, the pre-processing is a Z-score standardization or a normalization process on the hyperspectral image, as following implementations: performing the normalization process on hyperspectral data $X_0$ through the formula $$x'_{ijc} = \frac{2(x_{ijc} - x_{cmin})}{x_{cmax} - x_{cmin}} - 1 \text{ or } x'_{ijc} = \frac{x_{ijc} - \mu_c}{\sigma_c},$$

wherein $x_{ijc}$ denotes the value of pixel $x_{ij}$ at band c in row i and column j of $X_0$ (that is, pixel $x_{ij}$ is in row i and column j of $X_0$, and $x_{ijc}$ is the value of pixel $x_{ij}$ at band c). $x_{cmin}$, $x_{cmax}$ are the minimum and maximum values of band c in $X_0$ (that is, $x_{cmin}$ is a minimum value of the band c in the $X_0$, and $x_{cmax}$ is a maximum value of the band c in the $X_0$). $\mu_c$ and $\sigma_c$ are mean and standard deviation of band c, respectively (that is, that is, $\mu_c$ is mean of the band c , and $\sigma_c$ is standard deviation of the band c). The generated data is represented by $X'_0$.

Step 2: Selecting half or less than half of the data containing labels extracted in step 1 randomly as the training set, and generating a ground truth label map with the same width and height as the image (also referred as hyperspectral image) in step 1, with the value of a category ID (that is, the width and the height of the ground truth label map of the training set is the same as the width and the height of the hyperspectral image in step 1, and the pixel value of the ground truth label map is the category ID). Then, setting pixels that are not position selected in the label map (also referred as ground truth label map) as a background value to be ignored in subsequent calculation of a loss function(this process can be achieved by setting ignore_value in Pytorch's CrossEntropy loss function).

Figure 1:
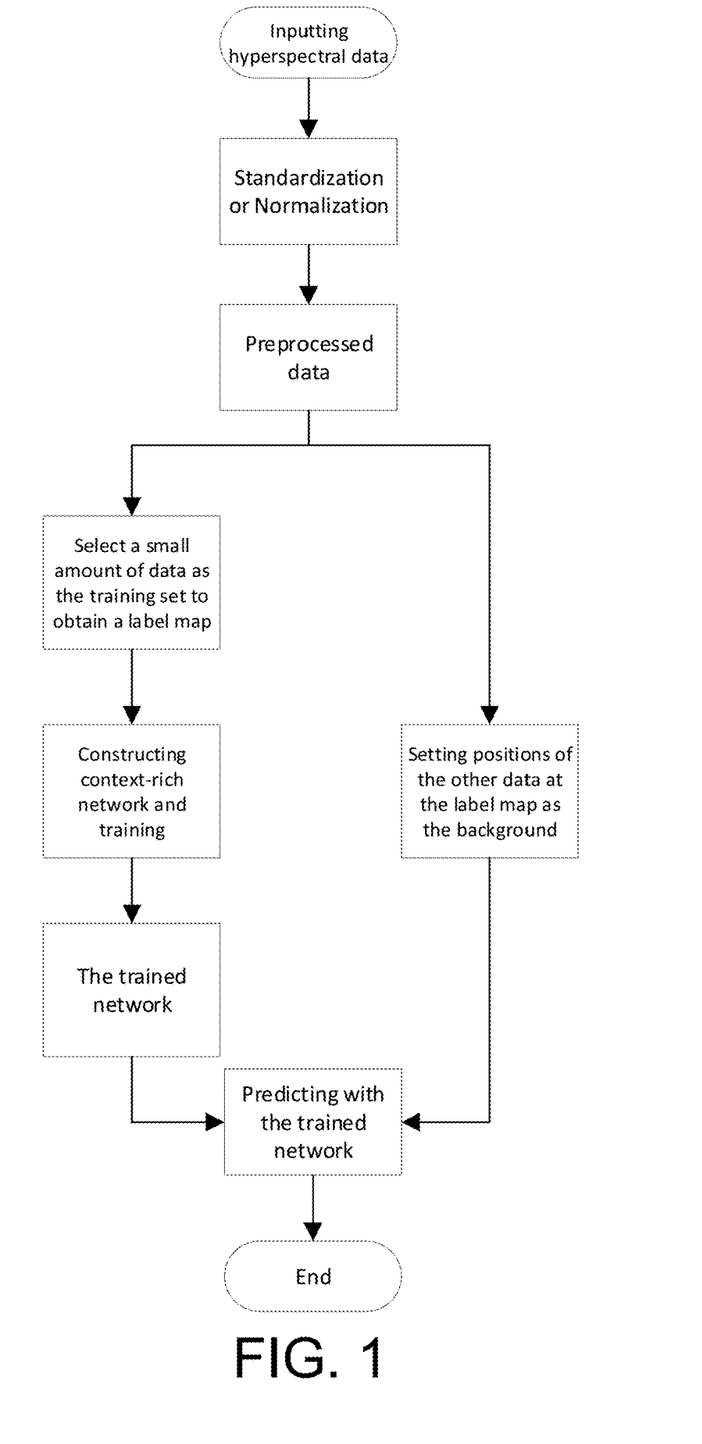
FIG. 1 shows a flow schematic diagram of the embodiment of this invention.
Figure 2:
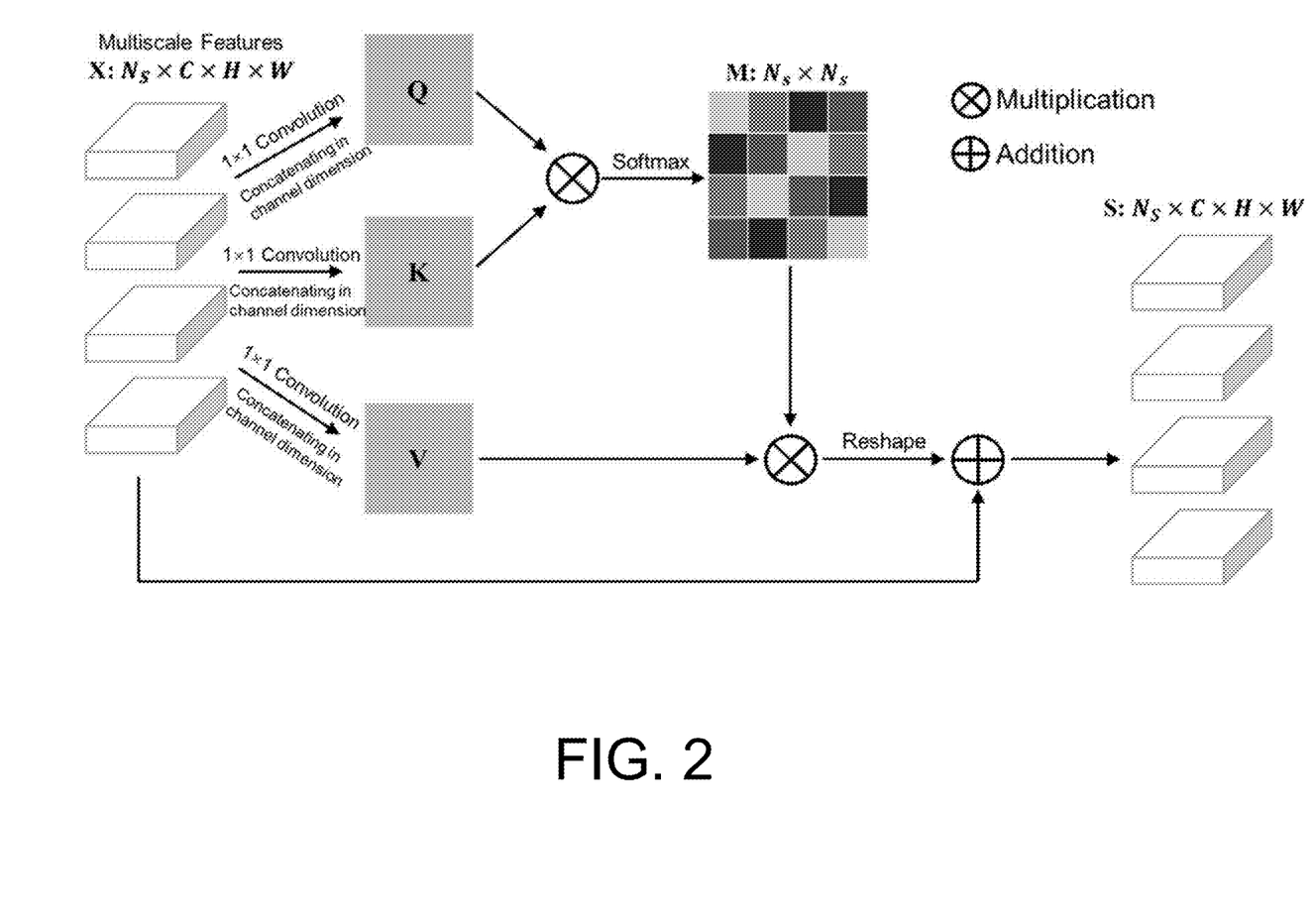
FIG. 2 is a schematic diagram of extracting inter-feature context information of the invention.
Figure 3:
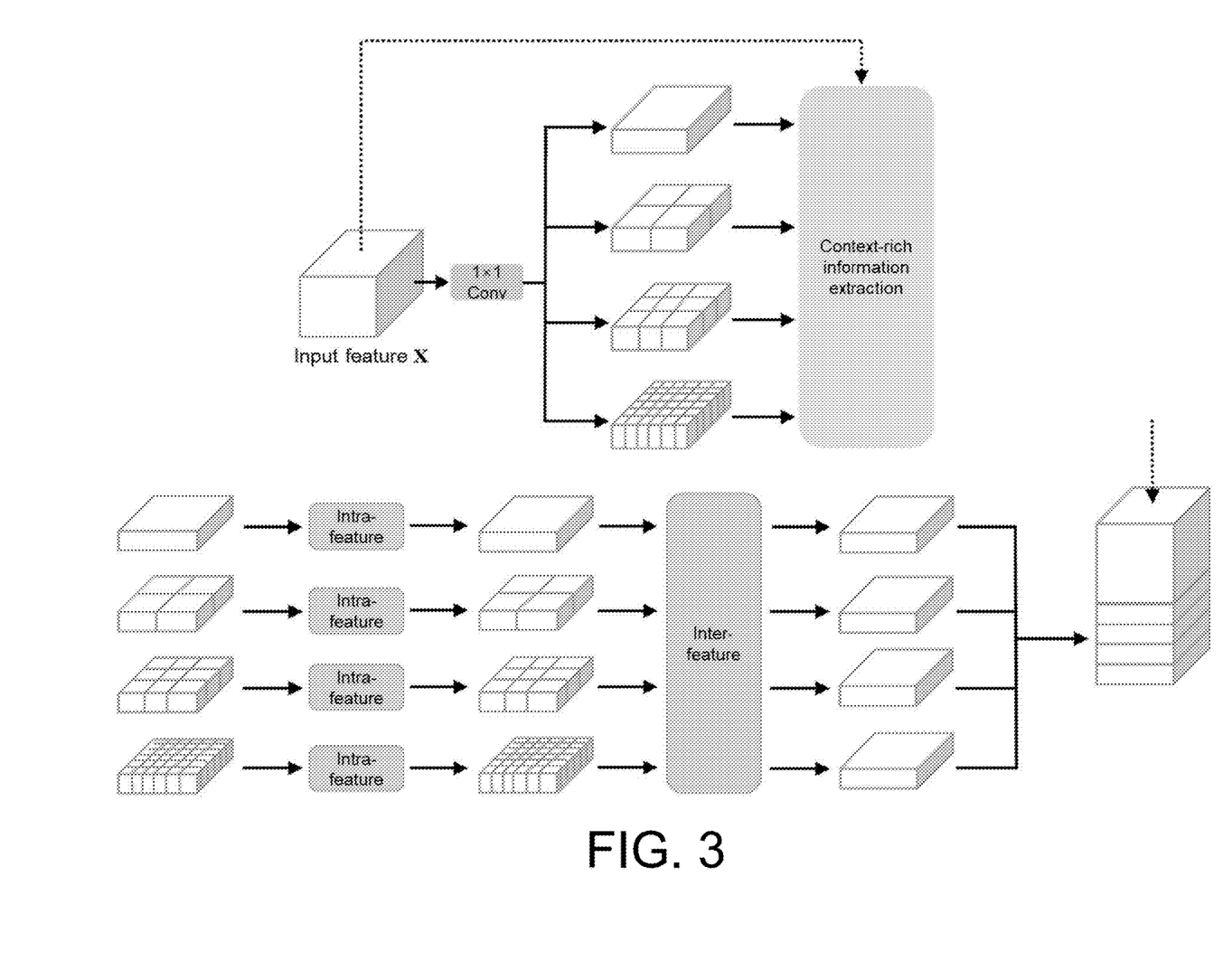
FIG. 3 is the schematic diagram of the context-rich information capturing module of the invention, where the above figure is a complete flow path of the context-rich information capturing module, and the below figure demonstrates the context-rich information extraction part of the context-rich information capturing module.
Figure 4:
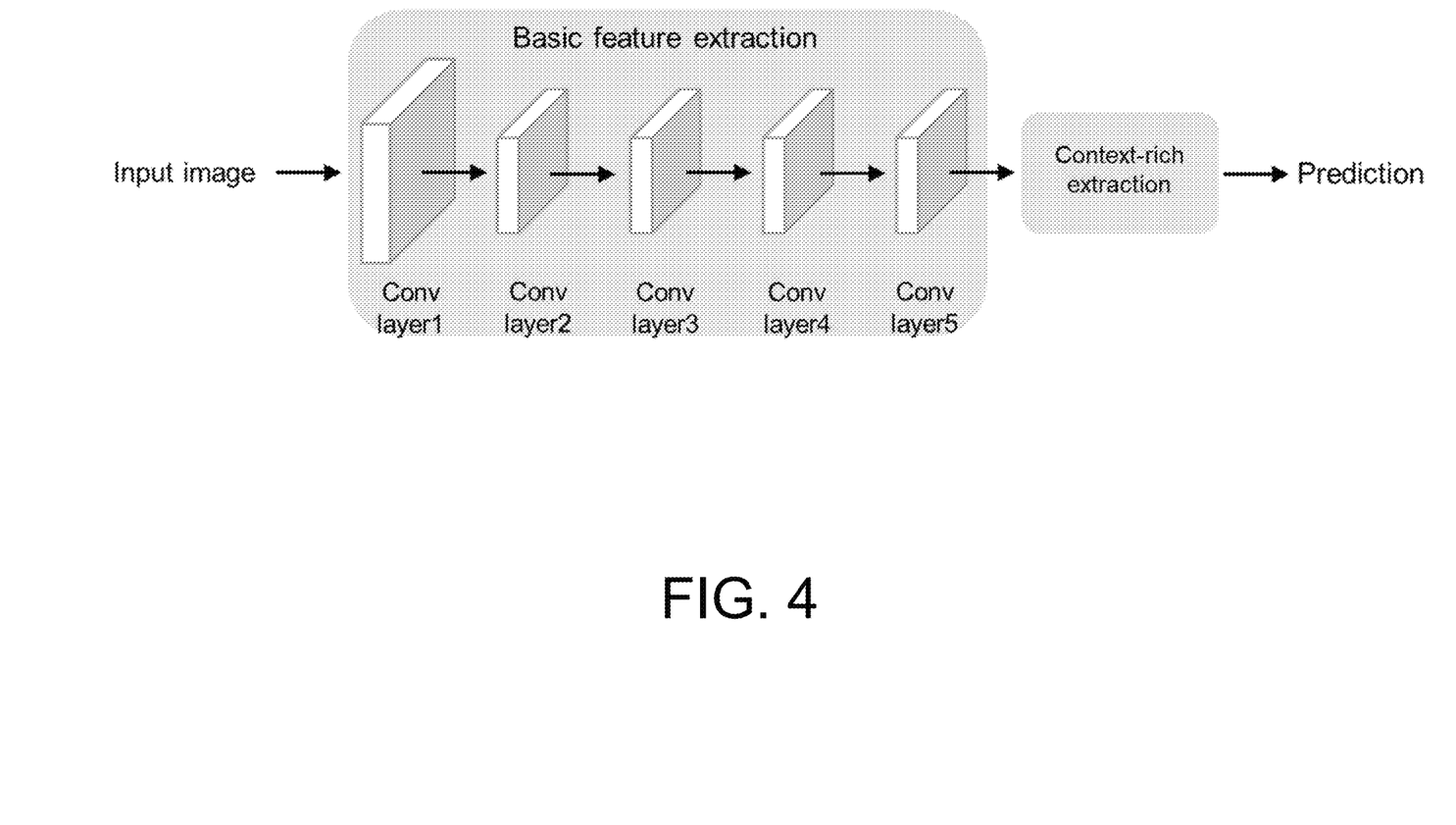
FIG. 4 is the schematic diagram of the context-rich classification network in this invention.

Step 3: Constructing the context-rich network, the overall structure of the network (also referred as context-rich network) is divided into three parts: a feature extraction module, a context-rich information capturing module, and a classification module. The feature extraction module is used to process the inputted pre-processed hyperspectral image to obtain a feature X. The feature extraction (i.e., the feature extraction module) is directly passing the inputted pre-processed hyperspectral image (i.e., the normalized hyperspectral image in step 1) through five convolutional layers (the number of the convolution kernels of the five convolutional layers are 64, 112, 160, 208, and 256). These convolutional layers all contain three operations including convolution (size=3, stride=1, padding=1), group normalization (16 groups) and nonlinear mapping (ReLU). The first convolutional layer is followed by an average pooling layer (size=2, stride=2). Then, the context-rich information capturing is conducted. Concretely, the feature $X = \{X_i \in \mathbb{R}^{C_0 \times H \times W}\}_{i=1}^{N_s}$ obtained by convolutional layers (i.e. the feature extraction module) is meshed into grids of different sizes in different parallel paths parallelly. These grids are actually the virtual boundaries for subsequent intra-feature relationship capturing. $C_0$, H and W are the channel number, width and height of X respectively, and $N_s$ is the number of paths. The numbers and positions of grids in these paths can be determined by referring literature: (Zhao et al, "Pyramid scene parsing network," CVPR. 2017.) and (Yuan etal, "Ocnet: Object context network for scene parsing," CoRR. 2018.). Taking FIG. 3 as an example, there are 4 paths, each with different number of grids, which are $(1, 2^2, 3^2, 6^2)$, respectively. Before performing intra-feature context information extraction, the dimension of each feature $X = \{X_i \in \mathbb{R}^{C_0 \times H \times W}\}_{i=1}^{N_s}$ is reduced to C=64 with a 1×1 convolution. In each path, intra-feature relationship extraction is respectively performed within each grid to complete the spatial context information aggregation; For the path i that has n×n grids, that is, (a feature is) divided into n parts in the width direction and the height direction, respectively, wherein the size of each grid is $$\left\lfloor \frac{H}{n} \right\rfloor \times \left\lfloor \frac{W}{n} \right\rfloor.$$

Firstly, three 1×1 convolutions are respectively used to map the dimension-reduced X to three features: $Q_i$, $K_i$, $V_i$, where $Q_i$, $K_i$ have 16 channels, and the number of channels of $V_i$ is 64. For a grid g, the features within the coverage of this grid are taken respectively from features $Q_i$, $K_i$, $V_i$ and perform matrix shapes transformation, obtaining $q_g \in \mathbb{R}^{16 \times hw}$, $k_g \in \mathbb{R}^{16 \times hw}$, $v_g \in \mathbb{R}^{64 \times hw}$. a PAM module (parallel attention module) is used to realize a spatial context information extraction process in the grids; a feature set is obtained after completing the spatial context information extraction process in each path. In detail, using the $q_g$, $k_g$, $v_g$ respectively as the query feature, the key feature and the value feature for realizing the spatial context information extraction process in the grid, and generating a new feature $p_g \in \mathbb{R}^{64 \times h \times w}$ through the matrix shape transformation, wherein $$h = \left\lfloor \frac{H}{n} \right\rfloor, w = \left\lfloor \frac{W}{n} \right\rfloor.$$

This process can be formulated as $$p_g = \mathrm{softmax}(q_g^T k_g) v_g^T$$

Then, $p_g$ is filled to the position covered by grid g in the dimension-reduced feature $X_i$, while all the other grids are processed in the same way, thus obtaining a new feature $P_i$ that completes spatial contexts in that path. And each path will generate a new feature, denoted as a feature set $P = \{P_i \in \mathbb{R}^{C_1 \times H \times W}\}_{i=1}^{N_s}$. where $C_1 = 64$. That is, the feature set P can be obtained by aggregating the results of all path. Then, a scale context-aware module is used to extract a contextual relationship between features, obtaining the features that have both spatial and scale contexts (that is, both spatial contexts and scale contexts). In detail, the new added scale context-aware module is used to extract the inter-feature relationship: firstly, three groups of 1×1 convolution are utilized to respectively map P and concatenate the results in the scale dimension, obtaining the query feature $Q \in \mathbb{R}^{N_s \times C_2 \times H \times W}$, the key feature $K \in \mathbb{R}^{N_s \times C_2 \times H \times W}$ and the value feature $V \in \mathbb{R}^{N_s \times C_1 \times H \times W}$, wherein $C_2 = 16$ (that is $$C_2 = \frac{C_1}{4}\bigg).$$

Then, performing the matrix shapes transformation on Q, K, V to obtain $Q' \in \mathbb{R}^{N_s \times C_2 HW}$, $K' \in \mathbb{R}^{N_s \times C_2 HW}$ and $V' \in \mathbb{R}^{N_s \times C_1 HW}$ and the scale attention map $M \in \mathbb{R}^{N_s \times N_s}$ is obtained through the following formula:

$$M_{ij} = \frac{Q_i' K_j'}{\sum_{j=1}^{N_s} Q_i' K_j'}$$

Wherein i and j represent two different scales respectively (i.e., the indexes of two paths), and also the row and column positions of a corresponding attention value in the scale attention map. That is, i represents a first scale (index of a first path), j represents a second scale (index of a second path). Further, i is the row positions of corresponding attention value in the scale attention map, and j is the column positions of corresponding attention value in the scale attention map. Then, multiplying the scale attention map M with the value feature V' to obtain a new feature S that simultaneously perceive intra-feature and inter-feature context dependencies:

$$S = MV'$$

Finally, after concatenating S and X in a channel dimension, inputting it (the result of concatenating S and X) into the classification module. The classification module is used to predict a classification map. In the classification stage, the predicted classification map can be obtained by successively passing the concatenated result with S and X in the channel dimension through convolution (128 kernels, size=3×3, stride=1, padding=1), group normalization (16 groups), nonlinear mapping (ReLU), convolution (the number of convolutional kernels equals to category, size=1×1, stride=1, padding=0) and softmax function. The whole calculation process of the network is made up by four parts including forward propagation, error calculation, backward propagation and parameter updates.

Step 4: Training the context-rich network with the training set to achieve convergence of the loss function. During the training process, the network parameters adopt Xavier initialization. When optimizing the parameters (i.e. network parameters), the stochastic gradient descent algorithm with momentum is used to minimize the loss function of the network. The trained network can effectively classify (the extracted) context-rich features of the hyperspectral image. The network only uses cross-entropy loss, that is, the loss function (of the network) is a cross-entropy loss function.

Step 5: The hyperspectral image classification is completed by inputting the image pre-processed and to be classified in step 1 to the trained network (again).

Embodiment

Taking the Pavia University hyperspectral dataset as an example. The image was captured by the Reflective Optics System Imaging Spectrometer at Pavia University in northern Italy in 2001, as shown in the original image in FIG. 5. The size of the image is 610×340, and the spatial resolution of each pixel is 1.3 m. The image contains 103 channels with a wavelength range of 0.43-0.86 μm. This scenario contains 9 categories, which can be accessed by downloading the *.mat file of Matlab through https://www.ehu.eus/ccwintco/index.php/Hyperspectral_Remote_Sensing_Scenes. (a) of FIG. 5 shows the three-band false color image formed by taking the 50th, 30th and 20th channels of the data and the ground truth label map (different colors represent corresponding categories, and white represents no labels).

Applying the Z-score standardization or normalization process on the above hyperspectral data on the central processing unit (CPU) to obtain the $X'_0$ in step 1. (b) of FIG. 5 separately shows the three-band false color image composed of the 50th, 30th and 20th channels after the above two pre-processing methods.

Figure 5:
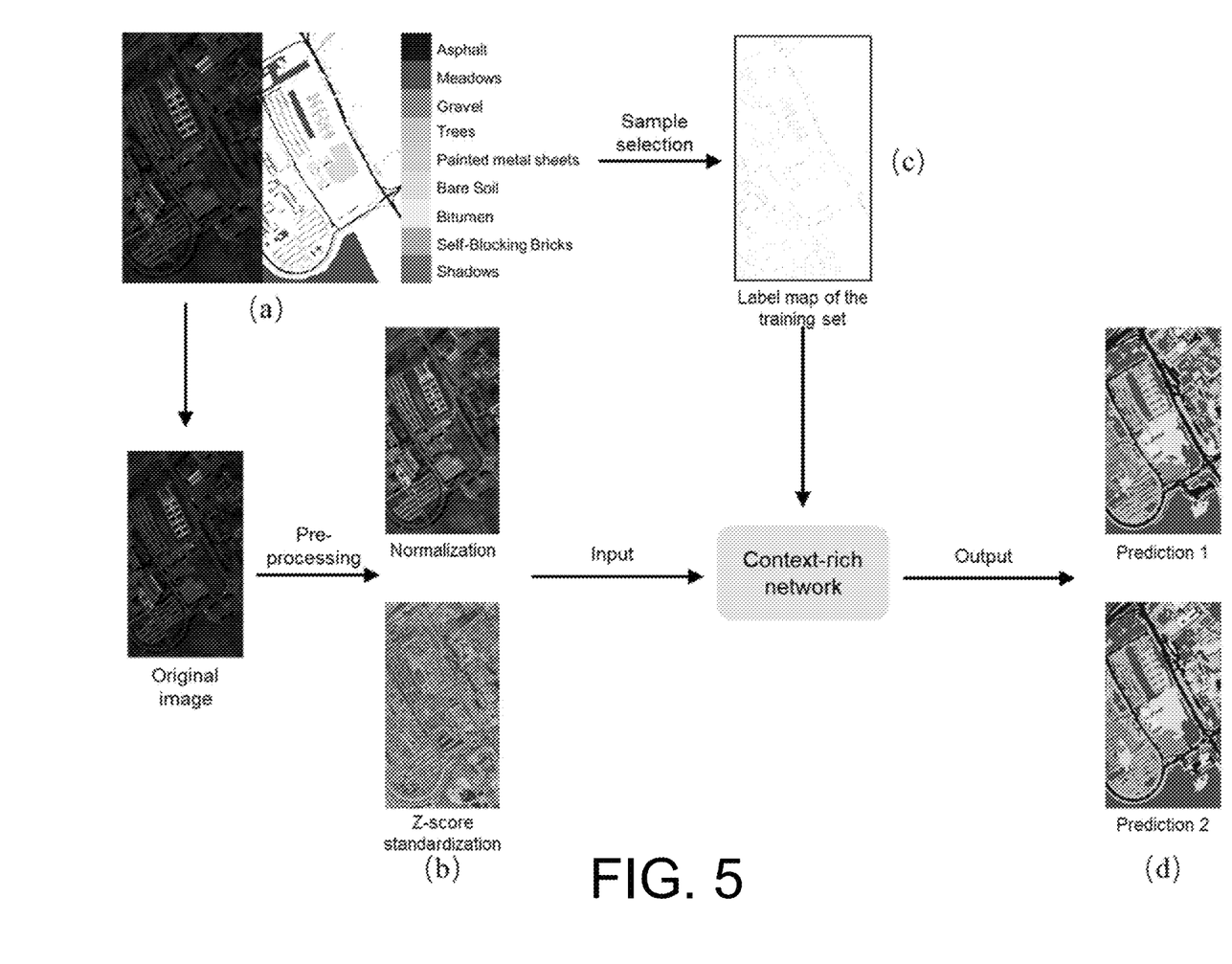
FIG. 5 is a schematic diagram of this invention that takes the Pavia University hyperspectral dataset as an example.

From the data with labels obtained above, 200 pixels are selected for each category as known samples to form a training set, and generate a ground truth label map of the training set that has the same width and height as the image in (a) of FIG. 5, as shown in (c) of FIG. 5, the pixel value of the ground truth label map is category ID, and the pixels in the rest positions of the ground truth label map are set to 255. At this time, the ignore_value of the CrossEntropy loss function in Pytorch is also set to 255. The above process is also achieved on CPUs.

Construct the context-rich network according to step 3, and use the label of the training set to train the network. The training process needs to be conducted on a server with CUDA. The CPU of the server can use Intel Xeon Gold 5118 2.30-GHz. Training the network according to step 4. During the training, the network needs to be migrated to the NVIDIA graphics processing unit (GPU). Considering the image size, a 16G NVIDIA Tesla V100 GPU can be employed.

Finally, according to step 5, inputting the preprocessed image to the network again to the GPU to obtain the classification map, as shown in (d) of FIG. 5. The colors of different pixels in the diagram correspond to the predicted categories on that pixel.

The above are the specific implementation steps of the hyperspectral image classification method involved in the present invention. The whole process comprehensively considers data preprocessing, feature extraction, context-rich information capturing, and classification, and realizes the classification of hyperspectral images by building an end-to-end network.

It should be understood that the parts not detailed in this specification belong to the prior art.

It should be understood that the above descriptions of preferred embodiments are relatively detailed. However, they cannot be considered as a limitation for the scope of protection in this patent of invention. Under the enlightenment of this invention, ordinary technical personnel in the art can also make replacements or deformation without departing from the scope protected by the claims of the present invention, all of which fall within the protection scope of this invention. The requested protection scope of this invention shall be subject to the attached claims.

What is claimed is:

1. A hyperspectral image classification method based on context-rich networks, comprising following steps:
   step 1, pre-processing a hyperspectral image;
   step 2, selecting a training set, and generating a ground truth label map with the same width and height as the image in step 1, with a value of a category ID, and setting pixels that are not position selected in the label map as a background value to be ignored in subsequent calculation of a loss function;
   step 3, constructing a context-rich network, an overall structure of the network is divided into three parts: a feature extraction module, a context-rich information capturing module, and a classification module;
   wherein the feature extraction module is used to process the inputted pre-processed hyperspectral image to obtain a feature X;
   a specific process of the context-rich information capturing module is: the feature X obtained by the feature extraction module is meshed into grids of different sizes in different paths parallelly, in each path, an intra-feature relationship extraction is performed within each grid in the grids respectively to complete a spatial context information aggregation, a PAM module (parallel attention module) is used to realize a spatial context information extraction process in the grids; a feature set is obtained after completing the spatial context information extraction process in each path, then, a scale context-aware module is used to extract a contextual relationship between features, obtaining the features that have both spatial and scale contexts, finally, inputting this feature into the classification module;
   the classification module is used to predict a classification map;
   step 4, training the context-rich network with the training set to achieve convergence of the loss function;
   step 5, a hyperspectral image classification is completed by inputting the image pre-processed and to be classified in step 1 to the trained context-rich network.

2. The hyperspectral image classification method based on context-rich networks according to claim 1, wherein: the pre-processing is a Z-score standardization or a normalization process on the hyperspectral image, as following implementations:
   performing the normalization process on hyperspectral data $X_0$ through the formula $$x'_{ijc} = \frac{2(x_{ijc} - x_{cmin})}{x_{cmax} - x_{cmin}} - 1 \text{ or } x'_{ijc} = \frac{x_{ijc} - \mu_c}{\sigma_c},$$

wherein $x_{ijc}$ denotes a value of a pixel $x_{ij}$ at a band c in a row i and a column j of the $X_0$, $x_{cmin}$, $x_{cmax}$ are a minimum value and a maximum value of the band c in the $X_0$, $\mu_c$ and $\sigma_c$ are a mean and a standard deviation of the band c, the generated data is represented by $X'_0$.

3. The hyperspectral image classification method based on context-rich networks according to claim 1, wherein: the feature extraction is directly passing the inputted pre-processed hyperspectral image through five convolutional layers, these convolutional layers all contain three operations including a convolution, a group normalization, and a nonlinear mapping, a numbers of convolution kernels of the five convolutional layers are 64, 112, 160, 208 and 256, respectively, wherein a first convolutional layer is followed by an average pooling layer.

4. The hyperspectral image classification method based on context-rich networks according to claim 1, wherein: the classification module includes five operations: a first convolution, a group normalization, a nonlinear mapping, a second convolution, and a softmax function, wherein the first convolution contains 128 convolution kernels, and a number of convolution kernels in the second convolution is the same as a number of categories.

5. The hyperspectral image classification method based on context-rich networks according to claim 1, wherein: during the training process, network parameters adopt Xavier initialization, and when optimizing the parameters, a stochastic gradient descent algorithm with momentum is used to minimize a loss function of the network, a loss function is a cross-entropy loss function, the trained network can effectively classify context-rich features of the hyperspectral image.

6. The hyperspectral image classification method based on context-rich networks according to claim 1, wherein:
   in the context-rich information capturing module, before performing intra-feature context information extraction, a dimension of the feature $X=\{X_i \in \mathbb{R}^{C_0 \times H \times W}\}_{i=1}^{N_s}$ obtained by the feature extraction module is reduced with a 1×1 convolution, wherein $C_0$, H and W are a channel number, a width and a height of X, respectively, and $N_s$ is a number of paths; in each path, the intra-feature relationship extraction is respectively performed in each grid to complete the spatial context information aggregation; for a path i that has n×n grids, that is, divided into n parts in a width direction and a height direction, respectively, wherein size of each grid is $$\left\lfloor \frac{H}{n} \right\rfloor \times \left\lfloor \frac{W}{n} \right\rfloor,$$

firstly, three 1×1 convolutions are respectively used to map the dimension-reduced X to three features: $Q_i$, $K_i$, $V_i$, for a grid g, the features within a coverage of this grid are taken respectively from features $Q_i$, $K_i$, $V_i$ and perform matrix shapes transformation, wherein both a channel number of $Q_i$, $K_i$ are c1, and the channel number of $V_i$ is c2, obtaining $q_g \in \mathbb{R}^{c1 \times hw}$, $k_g \in \mathbb{R}^{c1 \times hw}$, $v_g \in \mathbb{R}^{c2 \times hw}$; using the $q_g$, $k_g$, $v_g$ respectively as a query feature, a key feature and a value feature for realizing the spatial context information extraction process in the grid, and generating a new feature $p_g \in \mathbb{R}^{c2 \times h \times w}$ through the matrix shape transformation, wherein $$h = \left\lfloor \frac{H}{n} \right\rfloor, w = \left\lfloor \frac{W}{n} \right\rfloor,$$

this process can be formulated as $p_g = \text{softmax}(q_g^T k_g) v_g^T$ then, $p_g$ is filled to a position covered by grid g in the dimension-reduced feature $X_i$, while all the other grids are processed in same way, thus obtaining a new feature $P_i$ that completes spatial contexts in that path, and each path will generate a new feature, denoted as a feature set $P = \{P_i \in \mathbb{R}^{C_1 \times H \times W}\}_{i=1}^{N_s}$, wherein $C_1$ is a number of channels, $C_1 = c2 = 4c1$.

7. The hyperspectral image classification method based on context-rich networks according to claim 6, wherein: a specific implementation process of extracting the inter-feature relationship using the scale context-aware module is as follows;

firstly, three groups of 1×1 convolution are utilized to respectively map feature P and concatenate results in a scale dimension, obtaining the query feature $Q \in \mathbb{R}^{N_s \times C_2 \times H \times W}$, the key feature $K \in \mathbb{R}^{N_s \times C_2 \times H \times W}$ and the value feature $V \in \mathbb{R}^{N_s \times C_1 \times H \times W}$, wherein $$C_2 = \frac{C_1}{4},$$

then, performing the matrix shapes transformation on Q, K, V to obtain $Q' \in \mathbb{R}^{N_s \times C_2 HW}$, $K' \in \mathbb{R}^{N_s \times C_2 HW}$ and $V' \in \mathbb{R}^{N_s \times C_1 HW}$, and a scale attention map $M \in \mathbb{R}^{N_s N_s}$ is obtained through below formula:

$$M_{ij} = \frac{Q'_i K'_j}{\sum_{j=1}^{N_s} Q'_i K'_j}$$

wherein i and j represent two different scales respectively, that is, the indexes of two paths, and also the row and column positions of a corresponding attention value in the scale attention map; multiplying the scale attention map M with the value feature V' to obtain a new feature S that simultaneously perceive intra-feature and inter-feature context dependencies:

$S = MV'$ finally, after concatenating S and X in a channel dimension, inputting it into the classification module.

* * * * *